(12) United States Patent
Bonicatto

(10) Patent No.: US 10,715,886 B2
(45) Date of Patent: Jul. 14, 2020

(54) POWER OUTAGE-ASSESSMENT APPARATUSES AND METHODS

(71) Applicant: Landis+Gyr Technologies, LLC, Pequot Lakes, MN (US)

(72) Inventor: Damian Bonicatto, Pequot Lakes, MN (US)

(73) Assignee: Landis+Gyr Technologies, LLC, Pequot Lakes, MN (US)

( * ) Notice: Subject to any disclaimer, the term of this patent is extended or adjusted under 35 U.S.C. 154(b) by 245 days.

(21) Appl. No.: 15/615,619

(22) Filed: Jun. 6, 2017

(65) Prior Publication Data

US 2018/0352310 A1 Dec. 6, 2018

(51) Int. Cl.
*H04Q 9/02* (2006.01)

(52) U.S. Cl.
CPC .......... *H04Q 9/02* (2013.01); *H04Q 2209/60* (2013.01); *H04Q 2209/86* (2013.01)

(58) Field of Classification Search
CPC ... H04Q 9/02; H04Q 2209/86; H04Q 2209/60
See application file for complete search history.

(56) References Cited

U.S. PATENT DOCUMENTS

| | | | |
|---|---|---|---|
| 5,467,011 A | 11/1995 | Hunt | |
| 5,581,229 A | 12/1996 | Hunt | |
| 6,998,963 B2 | 2/2006 | Flen et al. | |
| 7,102,490 B2 | 9/2006 | Flen et al. | |
| 7,145,438 B2 | 12/2006 | Flen et al. | |
| 7,180,412 B2 | 2/2007 | Bonicatto et al. | |
| 7,224,740 B2 | 5/2007 | Hunt | |
| 7,236,765 B2 | 6/2007 | Bonicatto et al. | |
| 7,432,824 B2 | 10/2008 | Flen et al. | |
| 7,742,393 B2 | 6/2010 | Bonicatto et al. | |
| 7,791,468 B2 | 9/2010 | Bonicatto et al. | |

(Continued)

OTHER PUBLICATIONS

USPTO. International Search Report and Opinion dated Aug. 27, 2018, for related International Application No. PCT/US2018/034449.

(Continued)

*Primary Examiner* — Regis J Betsch
*Assistant Examiner* — Jeremy A Delozier
(74) *Attorney, Agent, or Firm* — Kilpatrick Townsend & Stockton LLP

(57) ABSTRACT

Aspects of the present disclosure are directed toward power outage assessment using customer-site communication devices which are powered by utility power lines and which communicate with a remotely-situated computer server over a broadband network according to certain schedules. The server can receive from the devices, communications indicative of an operating status of each respective communication device as expected according to the schedules. In response to receiving and/or not receiving the respective communications from the devices and taking into account other parameters, the server can assess a possible power outage within one or more regions by comparing the received communications and threshold criteria associated with the schedules. Based on such criteria, the server can detect and report on conditions suggestive of a power outage in regions associated with the communication devices.

18 Claims, 3 Drawing Sheets

(56) References Cited

U.S. PATENT DOCUMENTS

| | | |
|---|---|---|
| 8,238,263 B2 | 8/2012 | Kohout et al. |
| 8,325,728 B2 | 12/2012 | Zeppetelle et al. |
| 8,428,201 B1 | 4/2013 | McHann, Jr. et al. |
| 8,619,846 B2 | 12/2013 | Johnson et al. |
| 8,675,779 B2 | 3/2014 | Zeppetelle et al. |
| 8,681,619 B2 | 3/2014 | Bonicatto et al. |
| 8,693,580 B2 | 4/2014 | McHann, Jr. |
| 8,693,605 B2 | 4/2014 | Wolter et al. |
| 8,711,995 B2 | 4/2014 | Glende |
| 8,731,076 B2 | 5/2014 | Bonicatto et al. |
| 8,737,555 B2 | 5/2014 | Haug et al. |
| 8,750,395 B1 | 6/2014 | Woodruff et al. |
| 8,762,820 B1 | 6/2014 | Bonicatto et al. |
| 8,811,529 B1 | 8/2014 | Pelletier et al. |
| 8,842,563 B1 | 9/2014 | Duff et al. |
| 8,848,521 B1 | 9/2014 | Duff |
| 8,875,003 B1 | 10/2014 | Wolter et al. |
| 8,958,487 B2 | 2/2015 | Morris et al. |
| 8,989,693 B1 | 3/2015 | Duff et al. |
| 9,019,121 B1 | 4/2015 | Duff et al. |
| 9,037,305 B2 | 5/2015 | McHann, Jr. et al. |
| 9,081,684 B2 | 7/2015 | Haug et al. |
| 9,106,317 B1 | 8/2015 | Johnson et al. |
| 9,106,365 B1 | 8/2015 | Bonicatto et al. |
| 9,148,320 B1 | 9/2015 | Pelletier |
| 9,306,624 B1 | 4/2016 | Wolter et al. |
| 9,369,180 B1 | 6/2016 | Bonicatto |
| 9,461,707 B1 | 10/2016 | Virden et al. |
| 9,525,462 B1 | 12/2016 | Haug et al. |
| 9,647,495 B2 | 5/2017 | Bonicatto |
| 9,667,315 B2 | 5/2017 | Bonicatto et al. |
| 2004/0061616 A1 | 4/2004 | Fischer et al. |
| 2006/0217936 A1* | 9/2006 | Mason ............... G01D 4/004 702/188 |
| 2009/0125351 A1* | 5/2009 | Davis, Jr. ............ G06Q 20/027 705/79 |
| 2011/0077790 A1* | 3/2011 | Vaswani ............. G01D 4/004 700/291 |
| 2012/0146799 A1 | 6/2012 | Bell et al. |
| 2015/0100166 A1 | 4/2015 | Baynes et al. |

OTHER PUBLICATIONS

PCT Patent Application No. PCT/US2018/034449, International Preliminary Report on Patentability, Dec. 19, 2019, 11 pages.

* cited by examiner

POWER OUTAGE-ASSESSMENT APPARATUSES AND METHODS

BACKGROUND

Power utility companies use power distribution lines to carry power to customers spanning large geographic areas, typically from one or more power generating stations (or power plants) to residential and commercial customer sites. The power is carried on power distribution lines from the power plants at relatively high voltages and using alternating current (AC). Substations are commonly located near the customer sites to provide a step-down of the high voltage to a lower voltage (e.g., using transformers). Power distribution lines carry this lower-voltage AC from the substations to multitudes of customer sites at which endpoint (e.g., power-consumption metering) devices are installed to monitor and report on the power consumed at each site.

Power distribution systems can take on various different forms, oftentimes differentiated based on how the power distribution lines and the endpoint devices are used by the utility companies. One form of power distribution system, referred to as a power-line communication (PLC) system, has each of the multitudes of the endpoint devices configured to provide reports on the power consumed at each site by the endpoint devices transmitting this data back to the utility companies over the power lines. Another less-sophisticated type of power distribution system does not send data over the power lines (to/or from the endpoint devices), but rather relies on a meter reader to walk each customer site and manually read each such endpoint device in order to track the power consumed. Regardless of how the power distribution lines and the endpoint devices are being used and/or monitored, optimal system performance requires that the generated power being sent to each customer site reaches each site and is not interrupted.

Should power being provided to one or customer sites be interrupted, sometimes referred to as a power outage event, it is critical that the power utility companies (responsible for overseeing the power distribution) be informed promptly so that proper action and recourse can be taken to diagnose and correct the problem. In such outage events, however, the endpoint devices and/or the power lines are typically unavailable for use by the utility companies to discern which customer sites, or regions, have experienced the power interruption. Consequently, the utility companies often do not react in a timely manner and/or only in response to customers calling specified service centers to identify their location and complain of the outage events.

Given the importance of promptly knowing when power to customer sites have been interrupted and when power has been restored, various approaches have been developed to manage these power outage events. One of the more robust approaches has been implemented by the assignee of the instant disclosure (Landis+Gyr) in the form of an outage management system which uses power lines as part of the PLC systems for reporting back such events as a function of the power lines properly returned data from the endpoint devices installed at customer sites. Consider, for example, a multitude of endpoint devices scheduled at respective times to send (or transmit) power-meter data (each sending data once or twice per day) over the power lines for collection by the power-providing utility company. Should that scheduled data-transmission event, or expected strength of a received signal, not transpire as expected, a potential outage event can be detected. As another example, once a service team attempts to install power for the first time at a customer site or attempts to restore power after detection of a power-outage event, the service team waits to receive confirmation that the attempt has been successful by way of the endpoint device(s) being enabled once again to transmit the appropriate data over the power lines for collection as scheduled. Moreover, because such efforts to restore power are typically handled outside the customer-site facilities, once the efforts have been made to restore power, many such outage management systems have a difficult time discerning whether the efforts were successful from the perspective of the customers who are concerned with power being restored as a function of appliances operating once again inside the customer-site facilities. The delay and related costs involved with knowing when power to customer sites have been interrupted/restored, are significant.

Some of the more technically-robust outage management systems have implemented communications between customer sites through the use of mesh networks. In such mesh networks, layers of communication devices relay power outage information with communication connections being passed between adjacent communication devices, from the outermost layers towards the data collector device by way of nearby communication devices associated with the inner layers. This approach extends the communication reach of the outage management systems so as to reach customer facilities remotely located in the outermost layers of the network, and such systems can be implemented in a distributed manner so that there is no single point of failure. Moreover, when the outage event permits, this layer-to-layer communications approach can help to mitigate the above-discussed delays in terms of detecting outages and providing the service team with the needed confirmation. If, however, the outage event interrupts operation at any such communication device before the event data reaches an operative device at an inner layer, or the collector at the innermost layer, detection fails.

A related problem impacting both mesh-type and other outage management systems is the inability of such systems to promptly discern whether a power outage event is more likely isolated to a single or relatively small number of customer sites, more likely impacting an entire region of customer sites, or some situation in between these extremes. Discerning this type of information can be critical to deciding on what diagnosis/repair resources should assigned in order to promptly restore power.

SUMMARY

Aspects of the present disclosure are directed to addressing the above-discussed aspects as well as others which will become apparent based on the detailed description that follows. According to one embodiment of the present disclosure, aspects are directed to management of power outage events using apparatuses (e.g., systems and devices) and methods involving communication devices installed at customer sites and involving a remotely-located server which communicates with the communication devices over a broadband communication network. The communication devices are powered by utility power lines and each communicates with a remotely-situated computer server over a broadband network according certain schedules. The server can receive from the devices, communications indicative of an operating status of each respective communication device as expected according to the schedules. In response to receiving the respective communications from the devices, the server can assess a possible power outage within one or more regions by comparing the received communications and threshold criteria associated with the schedules. Based on such criteria, the server can detect and report on conditions suggestive of a power outage in regions associated with the communication devices.

In various embodiments the customer-site communication devices are enabled to communicate over the broadband network wirelessly (e.g., wireless communication devices such as WiFi-enabled or cellular-enabled appliances), and the computer server receives operating status information from each of the wireless communication devices at expected times. If the computer server does not receive operating status information from each of the wireless communication devices, the computer server can detect a condition suggestive of a power outage. Reporting a likely outage event can be based on a comparison of the operating status information and threshold criteria corresponding to how the communication devices should be communicating at expected times. These and other aspects of the present disclosure are exemplified in a number of illustrated implementations and applications, some of which are shown in the figures and characterized in the claims section that follows.

In accordance with one particular embodiment, a power-outage management system assess the efficacy of power being delivered from a power utility company over power lines to a plurality of customer sites. The system includes a plurality of communication devices and a particularly-configured computer server. The plurality of communication devices are respectively associated with the plurality of customer-sites communicatively, with each of the plurality of communication devices configured and arranged to operate by power received over the power lines at the associated customer site, and to communicate via a broadband communication network. The computer server is configured and arranged to be operated at a location that is remote from the plurality of customer sites and to be communicatively coupled to each of the plurality of communication devices via the broadband communication network. Over the broadband communication network, the computer server can receive expected communications during pre-defined ranges of time. With these expected communications, the computer server is configured to carry out the following actions. For each of the plurality of communication devices, the computer server can assess one or more miscommunications corresponding to when one or more of the expected communications are not received during the pre-defined ranges of time, and associate said at least one miscommunication with one or more respective regions or customer sites to which the power utility company delivers power over the power lines. The computer server can then compare said at least one miscommunication with threshold criteria indicative of when said at least one miscommunication for the one or more respective regions or customer sites corresponds to a possible power outage event at the one or more respective regions or customer sites. In response, the computer server can generate and output a report, for or on behalf of the power utility, which identifies the one or more respective regions or customer sites associated with the possible power outage event.

Other particular embodiments of the present disclosure are directed toward systems and methods using wireless communication devices which are powered by a utility company's power lines (as connected to the facility of the customer site) and communicatively coupled via an outage management system (OMS) via the Internet. According to certain aspects and embodiments, systems and methods as disclosed herein involve a computer server communicatively coupled to the wireless communication devices. The server is configured and arranged to receive from the plurality of wireless communication devices, a respective communication including an operating status of the associated wireless communication device. In response to receiving the respective communications from the subset of wireless communication devices, the server can assess a possible power outage within one or more regions. The server can assess the possible power outage for the region corresponding to the subset of wireless communication devices, and based on a comparison of the received communications and threshold criteria, where the threshold criteria correspond to a metric of wireless communication devices, not complying with expected communications over pre-defined periods of time. Thereby, the server can detect conditions suggestive of a power outage in the one or more regions in response to the one or more regions not complying with the expected communications.

Yet other embodiments are directed to new outage management services as well as to complement existing services provided by different types of outage management systems. Moreover, aspects of the present disclosure can work with and benefit a variety of communications systems and encompassing different types of broadband networks and different types of server configurations. For instance, these embodiments are directed to outage management systems in which the computer server (whether one or multiple acting as one to carry out certain actions) communicates (on behalf of the utility power company) directly with the customer-site communication devices at the respective facilities. In other embodiments, the computer server communicates (on behalf of the utility power company) indirectly with the customer-site communication devices using an intermediary server, for example, which might be another computer server (e.g., one or more computers in a cooperative arrangement) operated and controlled by an independent entity providing monitoring services to individuals residing in the facilities of the customer sites. Examples of such independent entities include facility-security companies such as Alarm.com (with cellular-enabled alarm systems, cameras and motion detectors for security), third parties selling device monitoring services/appliances (e.g., WiFi-enabled thermostats for temperature monitoring), and Internet Service Providers which provide Internet access to desktop CPUs and other Internet-enabled devices used within such facilities. Certain of these embodiments are also directed to broadband networks other than the Internet such as cellular telephone networks, cable networks and DSL, wherein these and other types of communication devices (e.g., WiFi-enabled thermostats, desktop CPUs and cellular-enabled alarm systems) are powered by power carried the utility company's power lines to each of the respective facilities.

In yet other embodiments, the computer server communicates (on behalf of the utility power company) by "pinging" certain residence-installed appliances (or third-party monitoring companies) in response to early indications of a power outage event, such as one or a few subscribing customers calling in to report an outage or feedback situations via other communications channels (e.g., PLC lines and mesh network channels). If, after further vetting by such pinging, sufficient power-outage evidence is recognized, a report is generated and service can be implemented on behalf of the utility power company.

The above summary is not intended to describe each illustrated embodiment or every implementation of the present disclosure. The figures and detailed description that follow, including that described in the appended claims, more particularly describe some of these embodiments.

BRIEF DESCRIPTION OF FIGURES

Various example embodiments may be more completely understood in consideration of the following detailed description in connection with the accompanying drawings, in which.

Figure 1:
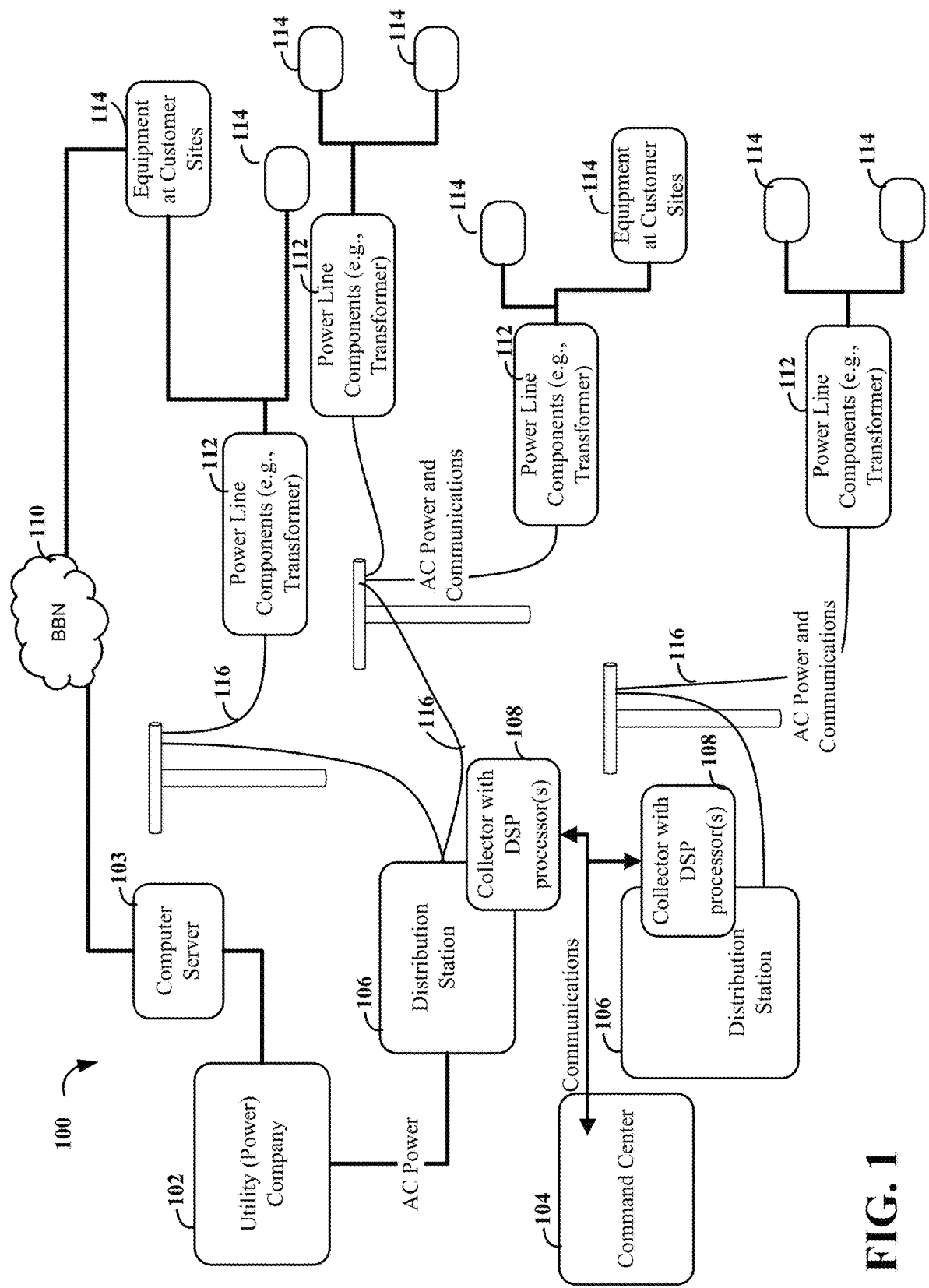
FIG. 1 is a block diagram of an example power line communication system in which endpoints (aka circuit-based endpoint devices) communicate data with collector units, consistent with embodiments of the present disclosure.

While the disclosure is amenable to various modifications and alternative forms, examples thereof have been shown by way of example in the drawings and will be described in detail. It should be understood, however, that the intention is not to limit the disclosure to the particular embodiments shown and/or described. On the contrary, the intention is to cover all modifications, equivalents, and alternatives falling within the spirit and scope of the disclosure.

DETAILED DESCRIPTION

Aspects of the present disclosure are believed to be applicable to a variety of different types of devices, systems and arrangements, including those that may be implemented for customers which subscribe to one or more services for receiving power generated and/or provided by a utility company and to one or more services for communicating over a broadband communication network. While the present disclosure is not necessarily limited to such applications, various aspects of the disclosure may be appreciated through a discussion of various examples using these contexts.

According to one embodiment which is consistent with aspects of the present disclosure, a power outage assessment system includes communication devices which are operative at customer sites as powered by energy from a utility company's power lines. The communication devices communicate with a remotely-situated computer server (e.g., operated under the auspices of the utility company or a third party) over a broadband network, with the broadband network being used by the communication devices to communicate with the remote computer server according to certain schedules or protocols known to the remote server or the utility company. The server can receive from the devices, communications indicative of an operating status of each respective communication device as expected according to the schedules or protocols. In response to receiving and/or not receiving the respective communications from the devices, the server can assess a possible power outage within one or more regions by comparing the received communications and threshold criteria associated with the schedules. Based on such criteria, the server can detect and report on conditions suggestive of a power outage in regions associated with the communication devices.

Consistent with more specific embodiments, network-enabled communication devices are located at respective homes, buildings and other facilities (i.e., customer-site facilities) at which electrical power is distributed by energy carried by power lines which are connected to the facility of a customer site. The network-enabled communication devices (or simply "communication devices") can be configured to communicate using different communication schemes and, optionally and applicable to PLC systems, can be configured by sending configuration data to the communication devices over shared power lines. Some, if not all, of the network-enabled communication devices may be wireless-enabled devices in which the communication devices communicate over the broadband network wirelessly such as by a WiFi or a cellular telephony protocol, while still being electrically powered via the power lines attached to the facility and operated by the utility company. Such broadband-enabled communication devices may include thermostats, water heaters, water softeners, washing machines, clothes dryers, dish washers, air conditioners and HVAC equipment generally, fixed (facility-installed) cameras, door locks, remotely-controlled sprinkler systems (such as sold under the tradename Rainbird), and remotely-controlled electrical components (e.g., light switches and outlets such as sold under the tradename WEMO by Belken (www.belkin.com/us/Products/home-automation/c/wemo-home-automation/).

In connection with the present disclosure, it has been discovered that broadband-enabled communication devices (e.g., Wi-Fi enabled thermostat or "smart thermostat") which are powered by energy from a utility company's power lines can be used not only as intended (e.g., for monitoring/controlling a facility's temperature), but can also be used with protocol-specific communications to serve an important role in an outage management system which is specifically configured to accommodate the broadband-enabled communication devices. Because these broadband-enabled communication devices are communicatively coupled to one or more broadband networks such as the Internet and cellular telephone networks, they provide users and third-party service providers access to the status and output data generated by the devices which, in the case of the example smart thermostat, is to monitor, report and/or adjustment of the temperature within the facility. By configuring a remotely-situated computer server to communicate over a broadband network with these communication devices (located at the customer sites), the computer server and the communication devices can be programmed/configured to communicate data/messages from the communication devices to the computer server according to certain schedules or protocols known to the remote server or the utility company. So long as the computer server receives these data/messages from the devices in accordance with expectations as defined by the known schedules or protocols, the computer server can assume that each such communication device sending the data/messages over the network has an operational status; this operational status in turn indicates that there is integrity in terms of power being provided from the utility company's power lines to the associated facility. As discussed further below, detection of an outage is not simply the opposite situation in which the computer server does not receive the data/messages from the devices in accordance with the expectations set forth by the known schedules or protocols.

For such communications devices equipped with a battery acting as a back-up (alternative) power supply, in accordance with aspects of the present disclosure, the communications devices are further configured to send a special message to the computer server to indicate this changed state, so that the computer server can recognize that a possible power outage event occurred at the facility.

It will be appreciated that the term "possible power outage event" is used here and throughout in such contexts because such changed states might also be the result of other events. Examples include, without limitation, circuit failure in the communications device, de-installation, detachment and relocation of the communications device by the user or a third party, etc. Use of wireless communication devices (such as smart thermostats discussed above) may allow service providers to more accurately identify and isolate possible power outages, and in the case of actual outages (and reinstallations of such communication devices), to more promptly identify when power has been restored. If a home or building has a power outage, it is very likely that the communication devices in the home or building will lose communications to the Internet.

Accordingly, in response to communications being received and/or not received from the respective broadband-enabled communication devices, the computer server uses the known schedules or protocols to assess such a possible power outage at the corresponding customer site(s) and to take action (based on conditions suggestive of a power outage) which may depend on whether computer server is operated on behalf of the utility company, or a third-party service provider acting on its own or in cooperation with the utility company. Consider, for example, a smart thermostat manufactured by GE (General Electric Company) and being installed in an office building and powered as conventional via power lines and described above. During operation, the smart thermostat may communicate with GE periodically. The smart thermostat may also communicate with a third party service provider that monitors and/or manages energy usage within the building. Consistent with examples of the present disclosure, an affiliate of the manufacturer (e.g., GE in the above example) and/or the third party service provider may assess communications received from the wireless communication devices in a particular region and identify and action on such conditions which may be taken to suggest a power outage. Such action(s) may include sending an information outage-specific communication to a user or users associated with the suggested power outage, to the power utility company, to a neighborhood watch group, and/or to one of more the above entities to inform of power being restored. Such communications may be transmitted to the user by email, text message and/or phone call, among other methods.

Aspects of the present disclosure are also useful to complement the behavior of an outage management system which uses a mesh network. As an example, consider such embodiments in which a computer server communicates with various endpoint (metering) devices through a mesh network in an effort to detect and provide service to power outage situations. In these environments and consistent with certain example embodiments, the computer server communicates (on behalf of the utility power company) by "pinging" regionally-representative residence-installed appliances (or third-party monitoring companies on behalf of such appliances) in response to early indications of a power outage event. Such early outage indications can include, as examples, one or a few subscribing customers calling in to report an outage or the computer server receiving irregular feedback (whether data omissions, data communications and/or measured strength of signals returned over the PLC lines). Another type of early outage indication can involve similar feedback from other power system communications channels (e.g., via PLC lines and/or mesh network RF channels). In these instances, the processing engine (e.g., the computer server on behalf of the utility power company) is configured and programmed to respond to such early indications of a power outage event by assessing tools available for gaining more information about the suspect power-outage region and, if the system permits for such pinging to aid in the analysis of whether the suspect region is very likely in a power outage mode, the processing engine engages in such pinging sufficient for the likelihood to be more fully vetted. If, after such further vetting by the processing engine, a threshold level of power-outage evidence is reached, a report is generated and service can be implemented on behalf of the utility power company.

As background, it will be appreciated that such a network includes a network of terminals such as communication circuits/servers and base stations, sometimes referred to as "nodes", as exemplified in an implementation using a wireless local area network (WLAN) for communications between nodes. In a mesh network, the nodes can act as a repeater to transfer data originating from another node to still another node. In a mesh network, long distances can be traversed, in particular on uneven or difficult terrain by the connectivity provided by each such set of nearby nodes. If a node fails, e.g., due to a hardware defect, its neighboring nodes seek out a different data transfer route. Mesh networks can include fixed or mobile devices. Detection of power outages within a mesh network may be limited in instances when communication between nodes is prevented due to a power outage. For instance, many wireless communication devices may have a "last gasp" transmission capability to tell the utility (or other entity) that a communicating node or endpoint has lost power. This last-gasp transmission serves as a surrogate for the customer's call, often allowing the problem to be fixed before the customer even becomes aware of the outage. In large outages the mesh layers furthest from the collector may get dropped because the outage messages may not have time to be forwarded using the "last gasp" method.

An OMS system/method according to the present disclosure can be combined with this mesh network to provide a secondary method of detecting power outages, which improves the efficacy and resolution of the outage system. As an example and consistent with the instant disclosure, power outage assessments are achieved even under "last gasp" situation by using the broadband-enabled communication devices in conjunction with the computer servers as described above. In this manner, the communication devices (acting individually or cooperatively in the mesh arrangement as discussed above) can communicate with the computer server directly over the broadband network or, using a third party's intermediary server, indirectly. Such third-party servers (on behalf of third-party service providers) may have their own unique protocols for expected communications with the communication devices. Nonetheless, complementary protocols can be defined between the third-party servers and the server operated by an entity acting on behalf of the utility (power) company so that the latter server can assess the possible outage event on behalf of the utility company for actions which would be determined by utility company.

As another type of example embodiment in which an intermediary computer server is operated by a third party service provider, consider for instance, "ABC Company" as both a manufacture of a smart (WiFi-enabled) thermostat operating a computer server that communicates with such a thermostat manufactured by ABC Company. ABC Company may communicate the operating-state information for the thermostat to a computer server operated on behalf of another third party service provider which may also be receiving communications relevant to another appliance in the same facility (e.g., a WiFi-enabled water heater). In response to receiving such operating state information from such another server, the third party service provider may itself summary such conditions and send a message to the interested entities (as described herein) that a power outage in a particular area may have occurred.

These computer servers, operated on behalf of third-party service providers and/or the utility power company, can be configured and arranged to receive from communications from the broadband-enabled communication devices in various ways. For example, each of the wireless communication devices may communicate specific data to the server for informing as to the operation of the device, such as power down and/or power up times, as well as settings such as temperature, humidity, back-up battery status, power state, etc. The communication devices may communicate historical data to the server, as well as operational information relating to the future operation of the wireless communication device (e.g., preprogrammed operational settings). This information, or more simplified messages/flags, can be communicated to the server in a number of manners. As a first example, the service provider can poll the communication devices to retrieve operational information from each respective device. Polling may include the service provider waiting for each wireless communication device to check operational information, and report it back to the service provider. The wireless communication devices may report such operational information to the service provider on a particular schedule, or pseudo-randomly. Second, the service provider may "ping" the wireless devices to request and expect feedback of operational information from each respective device. Such pinging may include the service provider sending a packet to the specified address of the wireless communication device and waiting for a reply from the wireless communication device, and this request for information may also be in response to particular criteria and/or events such as when a power outage is suspected in a particular region. Additional and/or alternative methods of communicating between the service provider and the wireless communication devices include various routing protocols, such as standards identified under IEEE 802.11S, and ad hoc routing protocols.

Consistent with certain embodiments of the present disclosure, the polling and/or pinging by the service provider may be in the form of an interrupt in which a preset timer is used to interrupt the communication devices that a message needs to be sent to the computer server (or service provider). In this manner, the interrupt alerts the computer processor (or operative logic circuitry) of the communication device that a high-priority condition has occurred and the event must be addressed promptly.

In accordance with example embodiments, the communications may be sent from the wireless communication devices on various schedules and/or in response to varying conditions. For instance, a particular wireless communication device may be configured to send a communication to the server (e.g., the service provider) on a periodic schedule, such as every fifteen minutes or every hour. The periodic schedule may vary by day and/or time, among other criteria. Similarly, the periodic schedule may be established for a particular group of wireless communication devices. For instance, a group of homes in a residential development may each have wireless communication devices configured to communicate with the service provider every half hour between the hours of 9 am and 5 pm, and every two hours between the hours of 5:01 pm and 8:59 am. In another example, a college campus may have wireless communication devices in each campus building configured to communicate with the service provider every hour from September through May, and once every four hours from June through August.

Various wireless communications devices may have different frequency of communicating with the service provider. For example, in a new construction area, model homes may have power on during the day but not at night, so as to save costs on energy. As such, the frequency with which the wireless communication devices (e.g., smart thermostats, etc.) communicate with the service provider (e.g., LG, GE, Kenmore, etc. and/or a third party service provider) may be higher during the day and off, or less frequent at night. Similarly, wireless communication devices in a business building may communicate with the service provider more frequently during working hours when power is being used by employees, and less frequently outside of business hours when power is not being used by employees. Or, conversely, the wireless communication devices in a business building may report less frequently when employees are in the building and more frequently when employees are gone from the building. In yet further examples, individual buildings and/or homes may have wireless communication devices that communicate with the service provider on different schedules based on cost savings. For example, a first house may communicate with the service provider every 15 minutes all day, while a second house may turn power off during working hours and therefore communicate with the service provider on a set schedule only outside of working hours.

In accordance with some example embodiments, the server may poll the wireless communication devices in a customized manner. For example, an owner of a home may shut off power for a period of time while they go on vacation, and as such, the wireless communication device may be configured not to communicate with the service provider during the vacation period, or perhaps at a lesser frequency during the vacation period. Similarly, the wireless communication devices may be modified to communicate with the service provider in response to input from other services. For example, if a security service provider (such as ADT, Frontpoint, Protect America, etc.) system reports that power at a particular location is out, such information can be passed along to the service provider to assess the particular location and surrounding area for a potential power outage. In another example, a homeowner or business owner may turn off mail delivery during a specified period of time while the homeowner or business is vacant. In such examples, the postal service could link to the service provider and instruct the service provider to poll the wireless communication device(s) at the associated building less frequently (or not at all) during the specified period of time. In such a manner, multiple wireless communication devices may communicate in an intelligent manner to communicate operational information and/or update a frequency of polling of wireless communication devices at a particular location.

Consistent with certain embodiments of the present disclosure, polling schedules may be established and modified for individual wireless communication devices, as well as for groups and/or subsets of wireless communication devices. For instance, large groups of homes and/or buildings may be maintained by a same entity, and therefore have a same schedule for communicating with the service provider. Similarly, large groups of individuals in a given community may collectively turn off their power for portions of a same week in an effort to reduce overall power usage in the community or to reduce spending on energy resources. In such examples, the wireless communication devices in the community may be configured to communicate with the service provider less frequently and/or not at all while power is off. Yet further, the service provider may ping various wireless communication devices in response to input from additional service. For example, a weather service may indicate that a storm is coming through a particular region. During the storm, the service provider may ping wireless communication devices in the particular region with increased frequency (such as every fifteen minutes instead of every two hours) until the storm has passed (as indicated by the weather service).

As described herein, each of the wireless communication devices may communicate with the server operated on behalf of a service provider. In some embodiments, the communication is sent from the wireless communication device to a manufacturer of the wireless communication device (such as GE, among others). Additionally and/or alternatively, the communication may be sent from the wireless communication device to a third party service provider and the manufacturer at a same time. Further, the communication may be sent from the wireless communication device to the manufacturer, and subsequently to the third party service provider. In such a manner, the third party service provider, with or without the manufacturer, may assess communications from wireless communications devices for conditions suggestive of a power outage.

In response to receiving the respective communications from the wireless communication devices (or subset of wireless communication devices, as the case may be), the server can be configured and arranged to assess a possible power outage within one or more regions corresponding to the subset of wireless communication devices, based on a comparison of the received communications and threshold criteria. Threshold criteria may be established that correspond to expected communications metrics for a given period of time. For instance, threshold criteria may be established for a group of buildings corresponding to a college campus, and the threshold criteria may be met if wireless communication devices within any one of the group of buildings fails to communicate with the server more than two consecutive times. Similarly, threshold criteria may be defined by default, such that the threshold criteria are met if any wireless communication device fails to communicate with the server at least one time. In such a manner, the threshold criteria may correspond to a metric for the wireless communication devices, in the one or more regions, not complying with expected communications over pre-defined periods of time. Moreover, the server can be configured and arranged to detect conditions suggestive of a power outage in the one or more regions in response to the one or more regions not complying with the expected communications. For example, if a group of wireless communication devices that all share a common power distribution path have not complied with expected communications with the server over a particular period of time (e.g., a same period of time), the server may identify that conditions exist in that particular power distribution path suggestive of a power outage. Identifying conditions suggestive of a power outage may assist in isolation, identification, and resolution of power outages.

Consistent with certain embodiments of the present disclosure, the server can be configured and arranged to obtain from a service provider that provides a service to the subset of wireless communication devices, a protocol-specific frequency with which the operating status is determined for each wireless communication device of the subset. Each wireless communication device may communicate with the service provider at different times and with a different frequency. For example, a first wireless communication device may communicate with the manufacturer of a smart thermostat every hour, thereby notifying the manufacturer that the wireless communication device is operating. In contrast, a second wireless communication device may communicate with the manufacturer (or a different manufacturer) every six hours, thereby notifying the manufacturer with less frequency that the wireless communication device is operating. The server, which may be operated by a third party service provider, may correlate the protocol-specific frequency for each wireless communication device, and determine whether conditions suggestive of a power outage are present based on the correlation.

For instance, the server can be configured and arranged to identify the protocol-specific frequency for each wireless communication device by assessing a database storing a device identifier, a physical address, and the protocol-specific frequency for reporting operating status for each respective wireless communication device. The database may store the protocol-specific frequency for each wireless communication device, and include additional information, such as the geographical location of the wireless communication device, a type of the device (e.g., a Wi-Fi enabled thermostat, a Wi-Fi enabled water heater, a wireless router, etc.), and an internet protocol (IP) address of the wireless communication device, among others. The database may further include information correlating a power supply path to the wireless communication device with other, "neighboring" wireless communication devices. Based on the data collected from the various wireless communication devices, and the information contained in the database, the server may perform a number of operations. For instance, the server can be configured and arranged to detect conditions suggestive of a power outage in the one or more regions in response to a determination that the wireless communication devices do not comply with the expected communications over the pre-defined periods of time, and a determination that communications should have been received from the wireless communication devices in the one or more regions based on the protocol specific frequency for each of the respective wireless communication devices. When the server detects that communications have not been received from wireless communication devices within a particular region in a certain period of time, and based on the protocol-specific frequency for each respective device, such communications should have been received, the server may determine that a power outage is likely to have occurred in the region (e.g., conditions are suggestive of a power outage in the region). In doing so, the server may compare the signals received from each respective wireless communication device, the frequency with which each device reports information to the service provider, and a communication path that each respective device uses. If no viable path from a particular wireless communication device is resulting in a communication being received from the device, the server may determine that an outage may be present in the particular region.

Consistent with certain embodiments of the present disclosure, the server can be configured and arranged to identify a power distribution path associated with a particular wireless communication device among the subset of communication devices. The power distribution path may be identified using the database and in response to a determination that a communication has not been received from the particular wireless communication device within a threshold period of time. For instance, the database may identify that a particular business building is in a power distribution path ABC456, and can also be serviced by power distribution path RFL859. The server may identify that wireless communication devices (e.g., smart thermostats, or other wireless communication devices) within the business building have not communicated with the service provider over two periods of time, when the service provider expected communications (based on the protocol-specific frequency for the building). The server may identify that the building is in power distribution path ABC456, and identify other buildings and/or homes that are in power distribution path ABC456 and/or RFL859. The server may then request a communication from (aka ping) the wireless communication devices in power distribution paths ABC456 and RFL859 and identify additional wireless communication devices that may be experiencing a power outage based on the identified power-distribution path. Particularly, the server can be configured and arranged to communicate with select wireless communication devices being within the same power-distribution path as the particular wireless communication device, and for each of the select wireless communication devices, identify if the wireless communication device is experiencing conditions suggestive of a power outage.

As described herein, each wireless communication device may have a different protocol-specific frequency for reporting to (e.g., communicating with) the service provider via the server, and therefore the conditions for identifying a suspected power outage may differ for each wireless communication device. Nevertheless, the server may detect conditions suggestive of a power outage in a first wireless communication device in response to the server not receiving an operating status from the first wireless communication device within a threshold period of time that is dependent upon the protocol-specific frequency of reporting for the first wireless communication device. Likewise, the server is configured and arranged to detect a power outage in a second wireless communication device in response to the server not receiving an operating status from the second wireless communication device within a threshold period of time that is dependent upon the protocol-specific frequency of reporting for the second wireless communication device.

As the protocol-specific frequency for polling (e.g., communicating) and/or "pinging" the wireless communication devices may vary for each device, such protocol-specific frequencies may also be dynamic over time, and the computer server of the OMS can analyze the specific broadband-enabled device and/or facility situation based on configuration data previously provided to and stored by the computer server for responding to communications indicative of a power outage involving such devices/regions. For instance, in a new home development, new houses may be built, thereby adding additional wireless communication devices in the OMS, and the computer server can be provided information to help analyze outage-indicative communications in such situations and for such devices/regions, optionally with instructions on how or when to issue outage service reports. Similarly, the computer server can be provided information to recognize when older, wireless communication devices may be removed, and any of the wireless communication devices in the system may be updated/replaced to accommodate a different communication protocol (e.g., intra-communicating in a frequency-hopping spread spectrum (FHSS) or merely dynamically identifying and reporting on the existence of wireless communication devices in proximity). Accordingly, the server may be configured and arranged to update the database in response to configuration data previously provided to the computer server for assessment purposes and/or in response to identification of new wireless communication devices within the OMS.

Aspects of the present disclosure are directed toward a processing circuit to receive the communication including the operating status of the subset of wireless communication devices from a service provider that provides a service to the subset of wireless communication devices. For instance, a processing circuit operated on behalf of the third party service provider may receive from a service provider/manufacturer (such as LG) communications including the operating status of a subset of wireless communication devices in a particular region. The processing circuit may receive the communication including the operating status of the subset of wireless communication devices from each respective wireless communication device of the subset of wireless communication devices, and detect conditions suggestive of a power outage within the region in response to a threshold number of the wireless communication devices satisfying the threshold criteria for detecting a power outage, as described herein.

Consistent with certain embodiments of the present disclosure, the processing circuit may transmit a communication to end-users associated with wireless communication devices affected by the power outage notifying the end-users of the power outage. Examples are not so limited, however, and the processing circuit may transmit a communication to the end-users notifying the end-users that power is restored.

In some examples, the processing circuit may send a series of communications to the plurality of wireless communication devices to further isolate and/or identify a suspected power outage. For example, the processing circuit may transmit a first communication to the service provider (e.g., GE) indicating the presence of the power outage in a particular region. The processing circuit may then transmit a second communication to each of the wireless communication devices affected by the power outage, the second communication requesting an operating status from each respective device. In response to receipt of an operating status from the affected wireless communication devices, the processing circuit may transmit a third communication to the service provider and the affected wireless communication devices indicating that the power outage has been resolved. In such a manner, the third party service provider (e.g., via the processing circuit) may quickly and efficiently notify a service provider and customers of both suspected power outages, and restoration of power, greatly reducing the time and expense needed to restore power after damage and/or failure.

While generally the third party service provider is described herein to identify and isolate power outages, and identify power restoration after power outages (via the aforementioned server and processing circuit), the third party service provider may provide additional advantages to the service provider and/or the customers of the service provider. For example, the third party service provider (via the server and/or the processing circuit), may generate a service report detailing a time, region, and circumstance of the possible power outage for future hardware and/or software repairs or upgrades. Such service reports may be used to identify risks for future power outages, to identify geographical regions most in need of repairs, and/or to identify malicious activity targeting electrical power suppliers.

Turning now to the figures, FIG. 1 is a block diagram of an example power line communication system in which endpoints (within 114) communicate data with collector units 108, consistent with power-line-communication (PLC)

embodiments of the present disclosure. These communications occur over the same power lines which provide power from the utility power company to each of the customer sites. In this context and as mentioned previously, aspects of the present disclosure have been realized to benefit embodiments which employ PLC and those which do not.

With reference to FIG. 1, the PCL system 100 includes a power distribution system overlaying a broadband communications network. Illustrated aspects of the power distribution system include the utility (power) company 102 which generates the AC power for distribution via various geographically-dispersed distribution stations 106, for consumption at the facilities of customer sites where respective sets of equipment 114 are located. The equipment 114 operates based on the power received over the power lines 112. In this illustrated example, the equipment 114 at each customer site includes an endpoint device (which is or at least includes a circuit, such as a power meter and/or load switch) installed at the customer site facility. In such a PLC-type system, the endpoint devices are typically also configured with circuitry for receiving configuration and other data from the collectors 108 (e.g., located in proximity to a grouping of nearby customer sites) and for sending back reports and status information to the collectors 108, which is in turn sent back to a computer server 103 operated on behalf of the utility (power) company 102. In such PLC systems, this information is sent in both directions, between the collectors 108 and the equipment 114, over the power lines. The computer server 103 refers to and/or includes one or multiple computers (processing circuit) operating together to carry out the communications as depicted and described herein.

FIG. 1 also shows a broadband communications network ("BBN") 110 coupled between the computer server 103 and the equipment 114 at the customer sites. Also within each of the depictions of equipment 114 of FIG. 1 is a respective communication device which is enabled for communications with the computer server 103 via the broadband communications network 110. In this context, the communication device is referred to as being broadband enabled. As discussed above, each of the broadband-enabled communication devices of the equipment 114 is powered via the power lines controlled by the utility power company 102.

According to one specific implementation, FIG. 1 illustrates a power-outage management system for assessing the efficacy of power being delivered from a power utility company 102 over power lines to a plurality of customer sites at 114. The system includes a plurality of broadband-enabled communication devices (within each of the customer sites at 114) and a particularly-configured computer server 103 which is configured to communicate with these communication devices via a broadband communication network 110 such as a cellular network, DSL connectivity or the Internet. The computer server 103 is configured and arranged to be operated at a location that is remote from the plurality of customer sites. As discussed above, the broadband communication network 110 permits the computer server 103 to receive expected communications during pre-defined ranges of time (e.g., every two 2 hours). With these expected communications, the computer server can assess miscommunications corresponding to when one or more of the expected communications are not received during the pre-defined ranges of time, and associate the miscommunication(s) with one or more respective regions or customer sites to which the power utility company delivers power over the power lines. The computer server can then compare the miscommunication(s) with threshold criteria indicative of miscommunication timing for one or more respective regions or customer sites that corresponds to a possible power outage event. In response, the computer server can generate and output a report, for or on behalf of the power utility, which identifies the one or more respective regions or customer sites associated with the possible power outage event.

In FIG. 1, endpoints 114 transmit symbols over communications channels to collector units 108, respectively. In certain embodiments, the endpoints 114 can be located at customer locations (e.g., buildings). Transformers 112 are often located near groups of customer sites, via substations/collector housings, to provide a step-down in voltage before the AC power is provided to the customer sites. The collector circuits (shown as units 108) include circuitry configured to communicate with the endpoints of the equipment 114 over the power lines 116, and typically also include circuitry (via high-speed network interfaces, a wide-area network, and Ethernet) for communications with a command center 104 which is operated on behalf of the utility power company.

In certain embodiments of the present disclosure, the collectors 108 are configured to receive data from many different sets of equipment 114 while storing the data in a local database. The collectors 108 may be operated by the manufacturer of the communication devices (as discussed herein), and/or by a third party service provider in communication with the manufacturer. A collector 108 can also take action based on the data received from the endpoints 114 and transmit data received from the sets of equipment 114 to the command center 104. The command center 104 may be operated on behalf of the third party service provider, and may represent a separate server as compared to the server operated on behalf of the manufacturer(s). For example, in a PLC network, the command center 104 can receive data indicating conditions suggestive of a power outage from a plurality of different types of communication devices (e.g., WiFi enabled appliances as in water heaters, smart thermostats, etc.) provided by different manufacturers. The command center 104 can retrieve data indicating that conditions exist among the endpoints 114 suggestive of a power outage, as discussed herein. Also, in response to related information provided by the communication devices which are miscommunicating as described above, the command center 104 and/or the computer server 103 can access a database 105 which stores the device identifier for the miscommunicating communication devices, its physical (customer site) address, and as may also be useful the protocol-specific frequency for each respective wireless communication device, for further assessing the possible outage event.

Consistent with certain embodiments, the command center 104 provides an interface that allows other devices to access data that has been received from endpoints 114. For example, the user devices might be owned by a service provider, maintenance personnel and/or customers of the service provider. In response to identification of conditions suggestive of a power outage, the command center 104 can provide data to user devices that are accessible by customers to provide information regarding the existence of the outage and potentially provide information estimating the duration of the outage.

The collectors 108 can communicate to the command center 104 over a wide area network (WAN), local area network (LAN), the Internet, or other communication networks. These data networks can be implemented as a wired or wireless network. Wired networks can include any media-constrained networks including, but not limited to, networks implemented using metallic wire conductors, fiber optic materials, or waveguides. Wireless networks include all free-space propagation networks including, but not limited to, networks implemented using radio wave and free-space optical networks.

Symbols from a particular endpoint may be transmitted, at specifically allocated times/frequencies to avoid data collisions on the power lines, over any one of thousands of communications channels in the system. For example, each endpoint can be assigned a particular channel using OFDMA or another channel allocation technique. Channel assignments for the endpoints 114 can be stored, for example, in a communications database that is accessible to the collectors 108. Consistent with embodiments of the present disclosure, each collector 108 can be configured to be in communication with thousands of endpoints 114 and there can be thousands of collectors 108 communicating with the command center 104. For example, a single collector can be configured to communicate with over 100,000 endpoint devices (e.g., power meters and load switches) at customer sites and a command center can be configured to communicate with over 1,000 collectors. Thus, there can be millions of total endpoints and many thousands of these endpoints can be considered region-specific or neighbor endpoints (many or all co-located with broadband-enable devices) for communications to the same collector over a shared power distribution line. In instances where some of these facilities have generators and/or battery backup circuits which operate to supply backup power in the event of a power outage, feedback from other than the broadband-enabled device can be used to supplement other indications or evidence (e.g., mesh, PLC neighbor as described herein) that an outage may have occurred for each such facility or region/neighborhood.

Accordingly, embodiments of the present disclosure are directed toward power outage assessment using wireless enabled communication devices.

Figure 2:
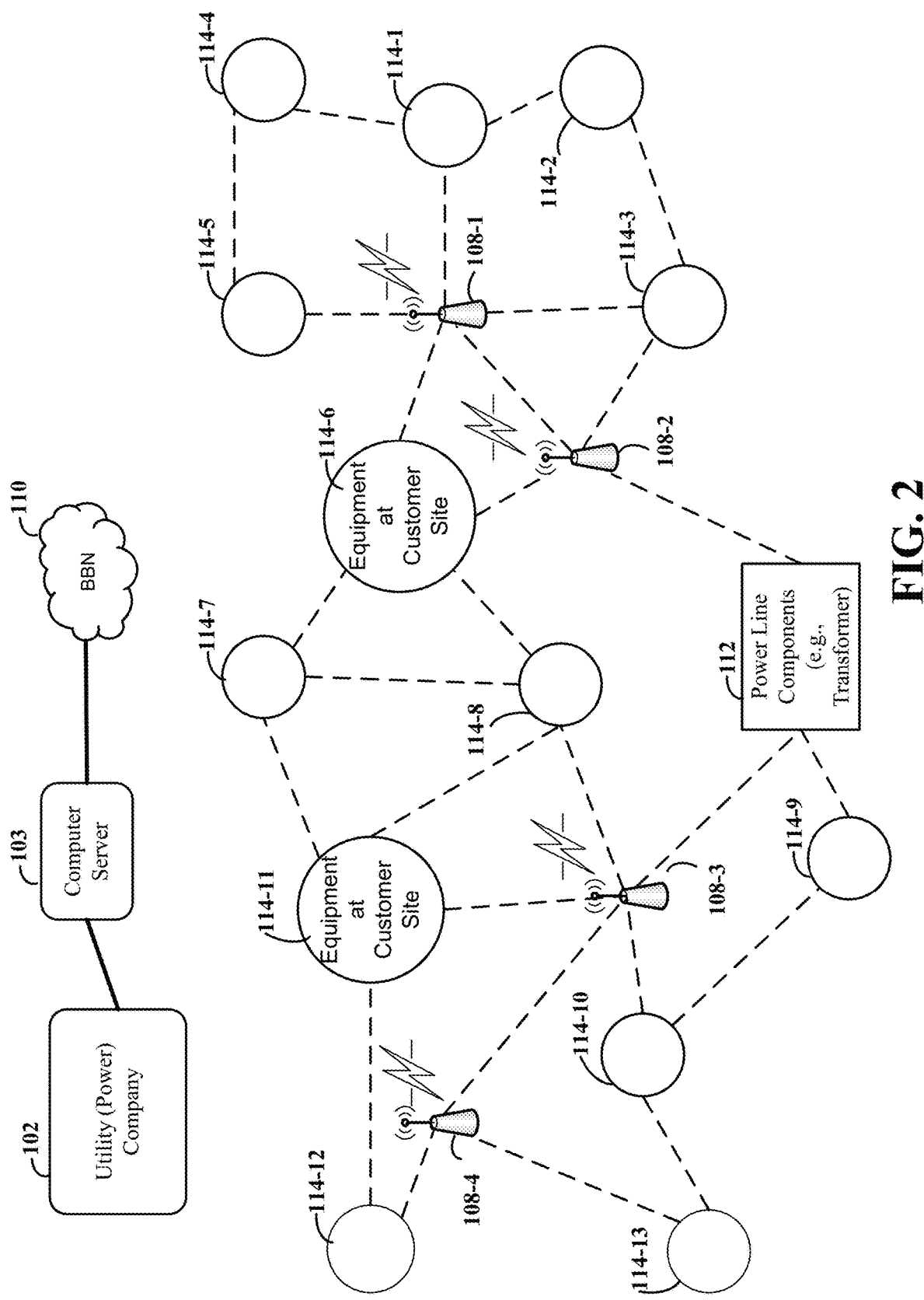
FIG. 2 further depicts a block diagram of an example power line communication system in which endpoints communicate data with collector units, consistent with embodiments of the present disclosure.

Also according to aspects of the present disclosure, FIG. 2 depicts a block diagram of another example power line communication system in which sets of customer site equipment 114-1, 114-2, etc. include endpoint devices and broadband-enabled communication devices for use in a mesh network. The equipment at the customer sites is power via the power lines, as previously discussed with FIG. 1, and using dashed lines in FIG. 2 to depict various power distribution paths available for routing power to each customer site. As discussed with FIG. 1, the endpoints communicate with the collector units (not shown in FIG. 2), and the communication devices communicate with a remotely-located computer server over a broadband communications network. Each of these devices is communicatively connected via an outage management system (OMS). In this mesh network, the endpoint devices may communicate with each other as conventional in a mesh communication network or via wireless routers 108-1, 108-2, 108-3, 108-4 (collectively as "routers 108") which are located in sufficient proximity to permit nearby devices to communicate device-to-device to reach remote regions covered by the power distribution system. The broadband-enabled communication devices, alone or in combination with the routers 108, are also configured to communicate over the broadband communications network, for example, by communicating with each other in a (hot-spot) communications repeater context to expand the RF coverage area (e.g., WiFi or cellular), and the broadband-enabled communication devices can also be configured to communicate directly over the broadband/RF network (e.g., Internet for the WiFi-type and/or the local cellular network). In this context, such mesh networks are complemented by the broadband-enabled communication devices to address or overcome the problems as discussed above in connection with "last gasp" outage situations. For each such implementation in which broadband-enabled communication devices are employed, the same types of communication schemes and protocols can be used as described herein to manage, discern and report likely outage events.

The computer server can also be communicatively coupled to the communication devices (not illustrated in FIG. 2) to receive data from a subset (referring to less than all) of the communication devices in the system. For example, in certain OMS implementations, conventional operation of the mesh network is employed throughout the power distribution system and broadband-enabled communication devices are added only in regions believed to be representative of areas critical to determining an outage. Such subsets of broadband-enabled communication devices used for representing sampled regions to reflect the system as a whole.

As described herein, the server may be configured and arranged to assess a possible power outage within one or more regions corresponding to the subset of broadband-enabled communication devices, in response to receiving the respective communications from the subset of broadband-enabled communication devices, and in response, recourse can be taken for discerning other nodes that might be affected by the outage and/or for isolating the cause of the outage and therefrom determining where and how to effect reparations for power recovery. For example, each of the broadband-enabled communication devices may be coupled to the power line components 112 by a variety of power distribution paths, as illustrated. Each of the communication devices 114 may be enabled for wireless communication (with one another) via the routers 108, with the computer server permitted to communicate with each of the communication devices 114 as described hereinabove.

As another example, in response to the server not receiving a communication from a particular one of the broadband-enabled communication devices (e.g., equipment at 114-1), the computer server can identify other customer sites in the same region and ping each such site to assess whether they may also be experiencing the outage. In instances where the computer server discerns that other customer sites (e.g., such as at 114-2, 114-4, 114-6) share a common power distribution path with the miscommunicating equipment at 114-1, there is reason to ping such other customer sites for gaining a better understanding/analytics on the possible outage and its cause. Based on a comparison of communications the received from each of endpoints 114-1, 114-2, 114-4, and 114-6, and threshold criteria, the server may identify conditions suggestive of a power outage within a region corresponding to wireless communication devices (e.g., endpoints) 114-1, 114-2, 114-4, and 114-6. Moreover, with a better understanding of the possible outage and its cause, power recovery may be possible by using alternative power distribution pathways to provide power to the customer sites experiencing the outage.

Figure 3:
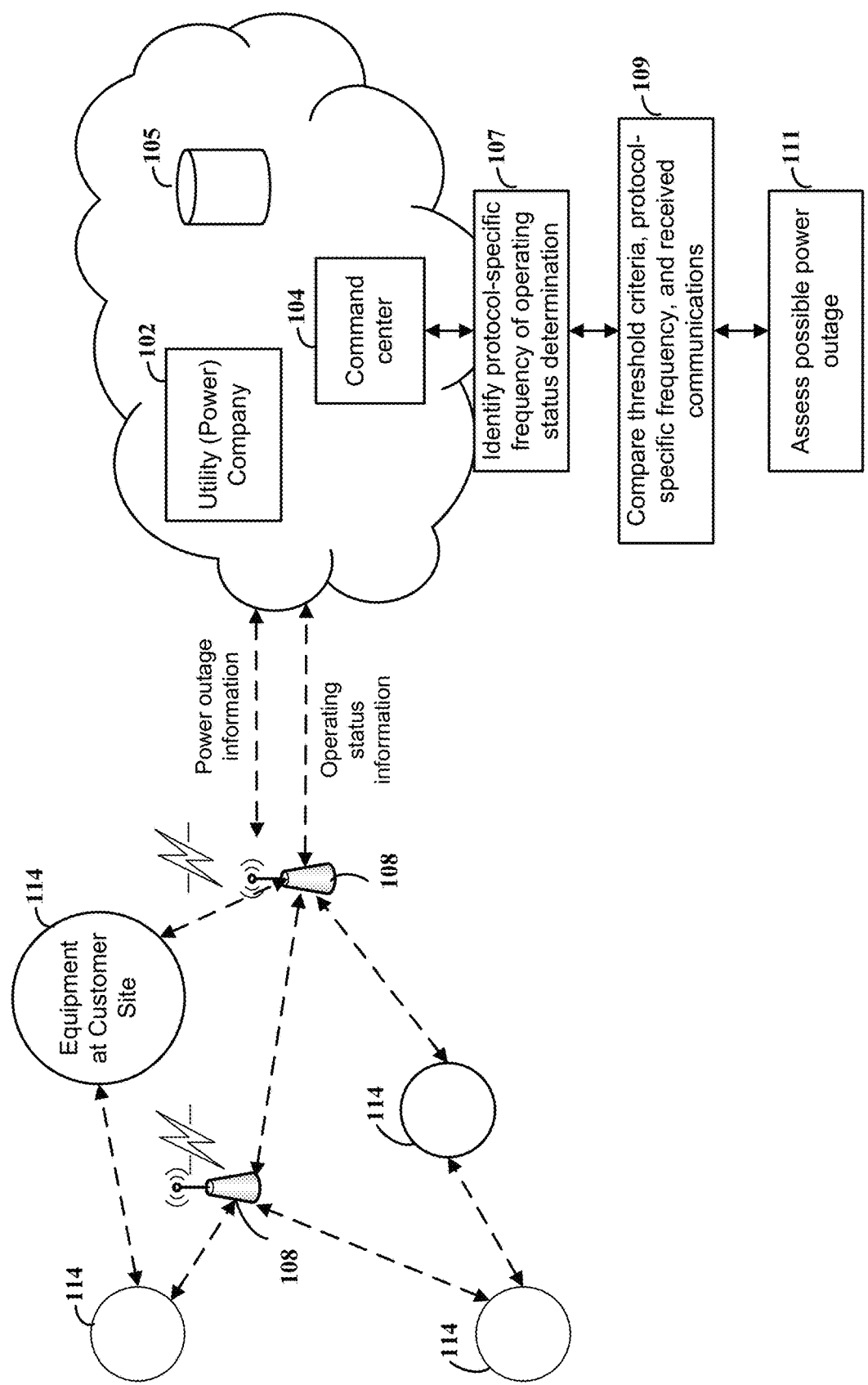
FIG. 3 depicts a flow diagram illustrating operation of an outage management system consistent with the present disclosure.

FIG. 3 depicts a flow diagram illustrating operation of an outage management system consistent with the present disclosure. Consistent with embodiments of the present disclosure, a command center (e.g., processing circuit) 104 may be communicatively coupled to a plurality of communication devices 114 via an outage management system. The communication devices 114 may also be communicatively coupled to a server of a service provider 102, such as a cloud service offered by a manufacturer of a wireless-enabled appliance receiving an electrical power supply. As illustrated, the processing circuit 104 may receive a communication including an operating status of a subset of the plurality of communication devices 114. While the processing circuit is capable of receiving communications from all communication devices 114 simultaneously, each communication device may have a protocol-specific frequency at which it communicates with the service provider 102 and/or the processing circuit 104.

As illustrated at 107, the processing circuit 104 may be configured to, in response to receiving the communication (either directly from the devices 114 or indirectly from the service provider 102), identify a protocol-specific frequency with which the operating status is determined for each wireless communication device of the subset. The processing circuit 104 may identify such protocol-specific frequency by assessing a database 105 storing a device identifier, a physical address, and the protocol-specific frequency for each respective wireless communication device, as described herein. At 109, the processing circuit 104 can be configured to compare, for each respective communication device, threshold criteria for detecting a power outage, the protocol-specific frequency, and the received communications. Based on the comparison, at 111, the processing circuit 104 can be configured to assess conditions suggestive of a power outage among the wireless communication devices 114, as described herein.

Unless otherwise indicated, various general purpose systems and/or logic circuitry may be used with programs in accordance with the teachings herein, or it may prove convenient to construct a more specialized apparatus to perform the required method. For example, according to the present disclosure, one or more of the methods can be implemented in hardwired circuitry by programming a general-purpose processor, other fully or semi-programmable logic circuitry, and/or by a combination of such hardware and a general-purpose processor configured with software. As another example, it will be appreciated that the term communication devices refers to and/or includes circuits enabled to communicate other devices, for example over the illustrated broadband network, such as WiFi and/or cellular enabled devices such as smart thermostats, smart water heaters and the like. For example, WiFi/cellular enabled devices may include a desktop CPU, tablet, smart phone, etc. Accordingly, the various components and processes shown in the figures can be implemented in a variety of circuit-based forms, such as through the use of data processing circuits (operative by circuit components alone or in combination with configuration/software data, otherwise known as "modules").

It is recognized that aspects of the disclosure can be practiced with computer/processor-based system configurations other than those expressly described herein. The required structure for a variety of these systems and circuits would be apparent from the intended application and the above description.

The various terms and techniques are used by those knowledgeable in the art to describe aspects relating to one or more of communications, protocols, applications, implementations and mechanisms. One such technique is the description of an implementation of a technique expressed in terms of an algorithm or mathematical expression. While such techniques may be implemented, for example, by executing code on a computer, and the expression of that technique may be conveyed and communicated as a formula, algorithm, or mathematical expression. For the purposes of this document, the term communication device4s refers to and/or includes circuits enabled to communicate, for example over the illustrated broadband network, such as WiFi and/or cellular enabled devices such as smart thermostats, smart water heaters and the like. For example, WiFi/cellular enabled device may include a desktop CPU, tablet, smart phone, etc.

In certain embodiments, machine-executable instructions are stored for execution in a manner consistent with one or more of the methods of the present disclosure. The instructions can be used to cause a general-purpose or special-purpose processor that is programmed with the instructions to perform the steps of the methods. The steps may be performed by specific hardware components that contain hardwired logic for performing the steps, or by any combination of programmed computer components and custom hardware components.

In some embodiments, aspects of the present disclosure may be provided as a computer program product, which may include a machine or computer-readable medium having stored thereon instructions which may be used to program a computer (or other electronic devices) to perform a process according to the present disclosure. Accordingly, the computer-readable medium includes any type of media/machine-readable medium suitable for storing electronic instructions.

The various embodiments described above are provided by way of illustration and should not be construed to necessarily limit the disclosure. Based on the above discussion and illustrations, those skilled in the art will readily recognize that various modifications and changes may be made to the present disclosure without strictly following the exemplary embodiments and applications illustrated and described herein. For instance, such changes may include variations on particular circuits and/or software code to implement one or more of the various modules. Such modifications and changes do not depart from the true spirit and scope of the present disclosure, including aspects set forth in the following claims.

What is claimed is:

1. A power-outage management system for assessing the efficacy of power being delivered from a power utility company over power lines to a plurality of customer sites, the system comprising:
a plurality of broadband communication devices configured to operate by power received over respective power lines at respective associated customer sites and configured to communicate expected communications with a computer server via a broadband communication network;
the computer server coupled to each of the plurality of broadband communication devices via the broadband communication network for receiving the expected communications during pre-defined ranges of time from each of the plurality of broadband communication devices, the computer server configured to generate and output a report which identifies customer sites associated with a set of the broadband communication devices that failed to communicate the expected communications during the pre-defined ranges of time;
wherein a computer system of the power-outage management system receives the report and uses the report in combination with information received from a set of mesh communication devices to define an outage region, wherein the set of mesh communication devices are part of a plurality of mesh communication devices configured to operate at the respective associated customer sites and to communicate with the computer system via a mesh network; and wherein the computer system identifies a selected customer site as within the outage region when the selected customer site is included in the report even though no outage message is received from a selected mesh communication device at the selected customer site when the computer system receives an outage message from a first mesh communication device associated with a first customer site and a power-distribution path connects the first customer site and the selected customer site.

2. The system of claim 1, wherein the broadband communication network includes one or a combination of Internet, digital subscriber line (DSL) network, cable communication network, and cellular telephony network.

3. The system of claim 2, wherein at least some of the plurality of broadband communication devices are configured and arranged to communicate with the computer server wirelessly, and wherein the computer server is further configured and arranged to identify a protocol-specific frequency corresponding to the one or more of the expected communications for each broadband communication device by accessing a database storing a communication device identifier, a physical address, and the protocol-specific frequency.

4. The system of claim 2, the computer server being further configured and arranged to:
identify a communications protocol specific to the one or more of the expected communications for each broadband communication device, and
detect conditions suggestive of a power-outage in one or more regions in response to a determination that the broadband communication devices do not comply with the expected communications over the pre-defined ranges of time, and a determination that communications should have been received from the broadband communication devices in the one or more regions based on the communications protocol.

5. The system of claim 1, wherein the computer server communicates for assessment of an actual outage event by pinging regionally-representative residence-installed appliances in response to early indications of an outage event, and wherein the computer server is configured and arranged to:
identify additional broadband communication devices that may be experiencing a power-outage based on the identified power-distribution path.

6. The system of claim 5, wherein the computer server is configured and arranged to:
communicate with select broadband communication devices being within the same power-distribution path as the additional broadband communication device; and
for each of the select broadband communication devices, identify whether the select broadband communication device is experiencing conditions suggestive of a power-outage.

7. The system of claim 1, wherein each expected communication from one of the broadband communication devices is a response to a periodic communication sent by the computer server.

8. The system of claim 1, wherein each expected communication from one of the broadband communication devices is a scheduled communication sent to a service provider and the computer server at a same time.

9. The system of claim 1, wherein each expected communication from one of the broadband communication devices is a scheduled communication sent to a service provider and forwarded to the computer server by the service provider.

10. The system of claim 1, wherein the computer server is configured and arranged to update a database in response to identification of wireless communication devices newly added or installed within the power-outage management system.

11. A method, comprising:
providing power to a plurality of customer sites via power lines, wherein a mesh communication device and a broadband communication device are located at each of the customer sites;
assessing the efficacy of the power being delivered over the power lines to the plurality of customer sites by:
receiving, by a computer system, outage messages from a set of the mesh communication devices configured to communicate via a mesh network;
receiving, by the computer system, a report that identifies a set of the customer sites, wherein the report is based on:
received communications between the broadband communication devices and a computer server, wherein the broadband communication devices are configured to communicate via a broadband network,
a protocol-specific frequency for communications between the computer server and at least one of the broadband communication devices,
an operating status for each of the broadband communication devices determined by assessing a database storing a device identifier, a physical address, and the protocol-specific frequency for each of the broadband communication devices, and
for each of the broadband communication devices, a comparison of threshold criteria for detecting a power outage, the protocol-specific frequency, and the received communications; and
determining an outage region based on the customer sites associated with the received outage messages and additional customer sites, wherein each of the additional customer sites is identified in the report and is connected via a power-distribution path to one of the customer sites associated with one of the received outage messages, even though no outage message was received from the additional customer site.

12. The method of claim 11, wherein the broadband communication devices are communication devices enabled for WiFi and/or cellular communication, the method further including assessing the efficacy of the power being delivered over the power lines to the broadband communication devices using the computer system by receiving the expected communication including the operating status of each of the broadband communication devices from a service provider that provides a service to each of the broadband communication devices.

13. The method of claim 11, further including assessing the efficacy of the power being delivered over the power lines to the plurality of broadband communication devices using the computer system by assessing conditions suggestive of a power-outage within a region in response to a threshold number of the broadband communication devices satisfying the threshold criteria for detecting a power-outage.

14. The method of claim 13, including the computer system transmitting a communication to end-users associated with communication devices affected by the power-outage notifying the end-users of the power-outage.

15. The method of claim 14, including the computer system transmitting a communication to the end-users notifying the end-users that power is restored.

16. The method of claim 14, including the computer system transmitting a first communication to a service provider indicating the presence of conditions suggestive of a power-outage in a region wherein said one of the broadband communication devices is located.

17. The method of claim 16, including the computer system transmitting a second communication to each of the broadband communication devices affected by the conditions suggestive of the power-outage, the second communication requesting an operating status from each of the affected broadband communication devices; and in response to receipt of an operating status from the affected broadband communication devices, transmitting a third communication to the service provider and the affected broadband communication devices indicating that the conditions suggestive of the power-outage have been resolved.

18. The method of claim 13, including the computer system generating a service report detailing a time, region, and a circumstance associated with a possible power-outage.

* * * * *